Patented July 28, 1942

2,291,201

UNITED STATES PATENT OFFICE 2,291,201

CLEANING CUPREOUS ARTICLES

William H. Bassett, Jr., Scarsdale, and Clermont J. Snyder and Willis G. MacLelland, Hastings on Hudson, N. Y., assignors to Anaconda Wire and Cable Company, New York, N. Y., a corporation of Delaware No Drawing. Application June 3, 1941,
Serial No. 396,394

16 Claims. (Cl. 148—8)

This invention relates to the cleaning of cupreous articles, and has for its principal object the provision of an improved method of removing scale from such articles. The method of the invention is particularly applicable to the removal of scale and loose metallic particles from cupreous articles, such, for example, as hot-rolled copper or copper alloy rods, wire bars, and the like.

Hot-rolled copper or copper alloy rods for use in the manufacture of wire are usually of relatively long lengths and small-size cross-sections, and are customarily coiled for handling. These rods are covered with an oxide scale of variable composition. The scale is made up of a mixture of cuprous, cupric and perhaps less common oxides of copper, with the cuprous (red) oxide usually predominating due to the presence of metallic copper. The cupric (black) oxide is mostly present as a skin on the outside of the scale. Before such hot-rolled rods are used in the manufacture of wire, or in similar fabricating operations, the scale should be completely removed. If the scale is not removed, the wire drawn from the rod will contain patches of oxide which promote the formation of slivers, dust, and surface pitting. Such imperfections render the wire unsuited for many uses.

Because of the extremely objectionable character of the oxide scale, it has been the common practice in the copper wire industry to employ one or more of the various known expedients for removing scale from hot-rolled copper rods. One such expedient is to pickle the hot-rolled rods in dilute sulphuric acid. Dilute sulphuric acid readily dissolves the black oxide component of the scale, but only slowly attacks the red oxide, and leaves harmful deposits of copper powder and undecomposed scale on the rods. The red oxide can be dissolved in solutions of strong oxidizing agents such as nitric acid, acid bichromate, manganese dioxide, etc., but these solutions are expensive and short-lived, and hence they have not been used extensively. Heating the rods to a high temperature and quenching in water will occasionally remove scale from cupreous and other non-ferrous metal articles, as the sudden change in temperature together with the steam formed at the surface of the hot metal is occasionally sufficient to shatter a part of the scale and break it loose. This method of scaling, however, usually leaves the surface of the metal badly discolored with a thin film of suboxide and patches of black and red scale, and further cleaning is generally required.

The most satisfactory method heretofore known for removing the scale from hot-rolled copper or copper alloy rods is by the mechanical expedient of die-scalping. This procedure involves drawing the rod backwards through a wire-drawing die formed with a sharp cutting edge at the rear of the die opening. The sharp rear edges of the die shave the surface layer of metal from the rod, and the oxide is of course removed with the metal shavings. This procedure gives the rod a fine, machined surface, but it produced a high scrap loss and entails an extra operation in the manufacture of the wire. Notwithstanding these disadvantages the presence of even small amounts of scale on the rods is so objectionable that die-scalping has been considered a necessary operation in the manufacture of all of the better grades of copper and copper alloy wires.

Our present invention involves exposing the cupreous article from which scale is to be removed to the vapors of a volatilizable metal halide, treating the article under conditions causing chemical reaction to occur between the scale and the metal halide, heating the article to a sufficiently high temperature to convert the scale to a form which separates readily from the article upon cooling thereof and cooling the heated article. As a result, the scale is caused to separate substantially completely from the article.

We have used successfully a large number of different metal halides in carrying out the method of our invention, but for large-scale operations we find that volatilizable metal chlorides in general and copper chlorides in particular are especially satisfactory. The metal halide vapors may be formed by heating the chosen metal halide itself to a temperature at which it has an appreciable vapor pressure, or by heating a mixture of reactants (such as a mixture of copper sulphate and sodium chloride) capable at the temperature of such heating of liberating the vapors of a volatilizable metal halide.

We have found that most satisfactory results are obtained if the article first is exposed to the vapors of the volatilizable metal halide while the article is at a temperature below about 700° F., and then is heated to a dull red heat. Both the exposure to the metal halide vapors and the subsequent heating may be effected with advantage in a unitary operation in which the cupreous article, while relatively cold, is introduced into a furnace in which the atmosphere carries an appreciable concentration of the metal halide vapors, then heating the article in the furnace to a dull red heat, thereafter withdrawing the article from the furnace, and finally cooling the withdrawn article.

The article after heating may be cooled in any desired manner, as in an air blast or even in still air, with consequent substantially complete separation of the scale. We have found, however, that it is particularly advantageous to cool the article by quenching in an aqueous medium.

The invention will be more fully understood from the following detailed description, presented with particular reference to removing scale from hot-rolled copper rods. It is understood, however, that the method of the invention is equally applicable to the treatment of other cupreous articles such as wirebars, copper alloy rods, extended shapes, castings, etc.

The first step in carrying out the new method is to expose the rod or other article to be scaled to the vapors or fumes of a volatilizable metal halide. Numerous metal halides are volatilizable and hence effective in the method of our invention. By "volatilizable" metal halides, we mean those halides which sublime (at least slowly), or which have an appreciable vapor pressure, at about the temperature prevailing in the hotter parts of the furnace in which the rods or other articles are treated, which temperature advantageously is of the order of 1100° F. to 1250° F. Excellent results have been obtained by exposing hot-rolled copper rods to the vapors of copper chloride (either cupreous or cupric chloride, or mixtures thereof). Other volatilizable metal halides, either alone or in admixture with one another, may be used with advantage. For example, satisfactory results have been obtained by exposing cupreous articles to the vapors of copper bromide, nickel chloride, cobalt chloride and iron chloride.

The metal halide vapors may be obtained by merely heating the metal halide itself to a temperature sufficient to effect appreciable vaporization or sublimation thereof. Alternatively, a mixture of metal salts (such as a mixture of sodium chloride and copper sulphate or nickel sulphate) may be heated to an elevated temperature with the resulting development of vapors or fumes of the desired metal halide (in the example, copper or nickel chloride). The metal salts used in accordance with our invention need not be anhydrous, although anhydrous salts may be used with advantage. Effective results may also be obtained by producing the vapors of the volatilizable metal halide by reaction between the halogen and the metal. For example, vapors of copper or iron chloride may be obtained within a suitable treating furnace by introducing chlorine into the furnace through a copper or iron tube. The chlorine reacts with the copper or iron tube at the elevated temperature of the furnace to produce vapors or fumes of the desired volatilizable metal chloride. We have used each of these procedures effectively.

The concentration of the vapors of the volatilizable metal halide in the atmosphere of the furnace or other chamber wherein the cupreous article is exposed to such vapors is not particularly critical. For example, we have found that scale may be removed from cupreous articles in accordance with our invention by exposing the article to an atmosphere containing from about 1 gram to about 200 grams, or even more, of the metal halide vapor per 1000 cubic feet of furnace atmosphere. However, the concentration of metal halide vapors is of importance to the extent that it affects the length of time the copper rods or other articles must be exposed to the vapor-bearing atmosphere to effect removal of a given amount of scale. For example, if the concentration of the vapors is only a few grams per 1000 cubic feet, the rods should be exposed to the vapors for about fifteen minutes before becoming heated to the final treatment temperatures, whereas if the concentration of the metal halide vapors is about 200 grams per 1000 cubic feet, this exposure need be only for about five minutes.

For effective removal of scale, the rod or other cupreous article, either during or directly after exposure to the metal halide vapors, must be treated under conditions causing chemical reaction to occur between the scale and the metal halide. We have found that such conditions are met if the article is held at a temperature below about 700° F. for a sufficient period of time during exposure to the vapors of the metal halide. The particular time of exposure, as indicated above, is to some extent dependent on the concentration of the metal halide vapors. Although the invention is not limited to any particular theory, our experiments lead us to believe that such exposure of the rods or other articles, while relatively cool, to the metal halide vapors, enables an effective amount of the halide to condense or otherwise collect on the rods, and to react with the copper oxides of the scale initially present to form a complex copper oxychloride. This complex compound apparently breaks down during final heating to form a scale which separates readily from the underlying metal when the rod is cooled. In general, any condition or set of conditions which brings the scale on the rod into contact with a sufficient quantity of the metal halide to react with the scale, and which also promotes the occurrence of the reaction by which the original oxide scale is converted to the complex oxychloride form, will, on final heating and subsequent cooling, bring about satisfactory removal of the scale. Effective scaling may be secured, for example, if the rod is introduced cold into the halide-bearing furnace atmosphere and therein is slowly heated to the final temperature; or the rod may be preheated to an elevated temperature below about 700° F. and may be held in the vapor-bearing atmosphere at this temperature, after which it may be heated to the final treatment temperature; or the halide vapors may be caused to condense or otherwise collect on a cold rod and the rod may then be heated in one or more treating furnaces, either gradually and steadily to the final treatment temperature, or in stages first to an elevated temperature below 700° F. and then to the final treatment temperature.

In the preferred practice of the invention, involving first exposing the rod or other article while at a relatively low temperature to the metal halide vapors, we have found that a temperature of about 700° F. is about as high as it is advisable to permit the rod to be heated before it is exposed to the halide vapors. Thus, if copper chloride vapors are employed, then the rod may be heated, before exposure thereto, to 700° F. or slightly higher, and effective scale removal will be secured, but better results are obtained if the rod is initially at a lower temperature. In a test made in this connection, using the vapors of cuprous chloride, it was found that when hot-rolled copper rods were preheated to 700° F. before being exposed to the vapors of cuprous chloride in a small electric furnace maintained at a temperature of about 1225° F., fairly good scaling was obtained. When the rods were preheated to only about 650° F. or lower, excellent scaling was obtained, but when the rods were preheated to a temperature of about 800° F., only poor scale removal was effected.

Particularly satisfactory results have been obtained by introducing the rods or other articles at about room temperature into a furnace in which is maintained an atmosphere containing roughly two grams of copper chloride vapors per 1000 cubic feet, and heating the rods in the furnace at the rate of about 50° F. per minute toward the final treatment temperature. In this manner the rods are exposed to the copper chloride vapors for about 12 to 15 minutes before their temperature is raised to above 700° F. If the concentration of copper chloride vapors is increased to about 200 grams per 1000 cubic feet, the heating rate may be increased to about 150° F. per minute, giving an exposure of 4 to 5 minutes before the temperature of the rods exceeds about 700° F.

In general, increasing the period of exposure at any given metal halide vapor concentration increases the amount of scale formed on and removed from the article and, if excessive, may spoil the appearance of the scaled article. On the other hand, decreasing the time of exposure at any given metal halide vapor concentration lessens the amount of scale formed and removed, and if excessive may result in the production of incompletely scaled articles. Longer or shorter periods than those specifically referred to above may be used, however. We have found that satisfactory cleaning of hot-rolled copper rods requires the removal of about 1.0% to about 2.0% by weight of the rod in the form of loose scale. Within this range we have found that the removal of scale amounting to about 1.2% to about 1.5% by weight of the copper rod is particularly desirable from the standpoint of both effectiveness and economy. Accordingly, the treatment of copper rods to remove scale in accordance with the invention should be vigorous enough to remove about this amount of material.

Following the treatment of the cupreous article by exposure to the metal halide vapor, the article is heated to a sufficiently high temperature to convert the scale to a form which separates readily from the article upon cooling thereof. We have found that this result is achieved economically and effectively if the aticle is heated to a dull red heat (say about 1100° F. to 1250° F.). Either higher or lower temperatures may be employed, however, provided the temperature is sufficiently high to condition the scale for easy detachment from the underlying metal when the heated article is subsequently cooled.

The heating may be carried out in any appropriate type of furnace. Uniform heating of the cuprous articles is particularly desirable. Preliminary exposure of the cupreous articles to the metal halide vapor and heating of the article to its final temperature both may be carried out advantageously in a continuous manner in a convection type fuel-fired furnace with a track along the top so that the articles to be heated can be hung on hooks and run through the furnace in an appropriate period of time. An electric muffle furnace also may be employed with good results.

The composition of the atmosphere in which the metal halide vapors are incorporated is not particularly critical. Satisfactory scaling has been effected in atmospheres composed of air, of carbon dioxide, of sulphur dioxide, of sulphur trioxide, of chlorine, and of combinations of sulphur dioxide and sulphur trioxide with chlorine, each atmosphere, of course, containing the necessary metal halide vapors. An atmosphere of nitrogen containing the metal halide vapors has been found to give considerably less satisfactory scaling than the other atmospheres referred to hereinabove.

The presence of oxygen in the treatment atmosphere is highly desirable, as it appears to favor rapid and satisfactory formation of the easily removable scale sought to be produced. Hence a furnace atmosphere of air containing the metal halide vapors is especially desirable. Moisture in the metal halide-containing atmosphere has been found in most instances to be beneficial, as it tends to improve somewhat the appearance of the scaled articles. If desired, moisture may be added extraneously by injecting steam into the furnace atmosphere. Hydrogen chloride, sometimes present in commercial metal chlorides, or formed by hydrolysis when moist chlorides are heated, is not detrimental to the removal of scale in accordance with our invention but is not desirable in the furnace atmosphere because it promotes discoloration of the articles. Such discoloration is generally harmless with respect to the quality of the treated articles, but it detracts from their appearance.

Cooling of the cupreous articles after they have been heated to the necessary final temperatures may be accomplished in any appropriate manner. Satisfactory scaling has been effected by allowing the heated articles to cool in air. Cooling may also be effected by quenching the heated article in an air blast or in oil. Particularly good results have been obtained by quenching the heated articles in water. Both substantially pure water and saline water, such as Hudson River water in the neighborhood of Hastings on Hudson, N. Y., having a saline content from about 2590 P. P. M. (low tide) to about 3850 P. P. M. (high tide) may be used, for example. Cooling by any of these means results in substantially complete separation of the scale from the article.

When the hot rods are immediately quenched in water, the scale readily and completely peels off the rods, and a by-product of clean copper scale collects on the bottom of the quenching tank and is periodically removed. Such loose pieces of scale as adhere to the rods may be washed off by means of a hose. Where the cleaned rods are to be drawn into wire, they may be subjected to the present customary cleaning operations, such, for example, as immersion in an acid pickle solution, hot argol dip, etc. Die-scalping, however is unnecessary, as the surfaces of the rods are clean and free from dust and red (or black) oxide patches.

The method of our invention is illustrated by the following description of an operation wherein hot-rolled copper rods were exposed to copper chloride vapors and were subsequently heated to a dull red heat. In this operation exposure of the rods to the copper chloride vapors and subsequent heating of the rods to the final temperature both were effected in a convection-type furnace twelve feet in length with a track extending along the top of the furnace so that the coils of rod could be hung on hooks and run through the furnace. The temperature in the furnace was graduated from about 1250° F. at the hot (rod exit) end to about 700° F., or somewhat higher, at the cool (rod entrance) end. A furnace atmosphere containing copper chloride vapors was established by maintaining commercial cupric chloride in a graphite crucible on the floor at the hot end of the furnace. About four ounces of this salt were added to the crucible every fifteen minutes. The atmosphere was circulated from the hot end toward the relatively cool end of the furnace. The furnace was operated in such manner that at all times four hooks each loaded with two 300 lb. coils of $\frac{7}{16}$ in. diameter black hot-rolled copper rods were within the furnace. The hooks were advanced at fifteen minute intervals so that once every fifteen minutes two cold untreated coils were charged into the furnace and two completely treated coils were removed from the furnace for cooling. This procedure gave a cycle of one hour through the furnace and a continuous production of 8 coils (2400 pounds) per hour.

In the regular course of this operation, the hot coils removed from the furnace were immediately quenched in water. As the rods were lifted from the quenching tank, they were washed with water from a hose to remove that part of the scale that did not come off during immersion of the rods in the tank. The scale separated freely from the underlying metal, leaving the rods bright and clean. The scale collected in the bottom of the quenching tank, and was periodically removed therefrom. The rods were then pickled in dilute sulphuric acid to dissolve any small patches of scale that had not been washed off, and washed to remove residual acid. The rods were then drawn into wire without it being necessary to subject them to die-scalping. The wire so produced was found to be of equal quality to wire produced from die-scalped rods. If in the course of the continuous process just described, a rod sample is taken from each of the four hooks within the furnace at the moment when the coils at the hot end are removed for quenching, and if these samples are allowed to cool in air, they appear as follows: The rod sample from the first hook (after being exposed to the copper chloride vapors in the relatively cool end of the furnace for about fifteen minutes) is predominantly bright red in color with yellowish brown streaks. The original scale appears to have undergone chemical transformation. It is now powdery and may be rubbed or brushed from the rods. Assay of the powdery coating shows large amounts of copper in cuprous and cupric forms, oxygen, and chlorides. The sample from the second hook (which has progressed toward the hot end of the furnace and has been in the furnace for about thirty minutes) is predominantly grayish black with brown streaks. Only a small portion of this relatively solid scale is loose. The sample of rod from the third hook (after being in the furnace for about forty-five minutes) is grayish black in color and scales quite readily upon cooling in air. The sample from the fourth hook (after one hour in the furnace and ready for removal) is also grayish black in color and scales freely in large flakes and strips, which in many instances are three inches or more in length.

Although the method of our invention has been described herein with particular reference to the treatment of hot rolled copper rods, it is understood that our method is applicable also to other cupreous articles. Thus, not only relatively pure copper but also copper alloys (particularly alloys containing upwards of 70% copper) having a dark oxide scale have been treated with satisfactory results in accordance with the invention. Rods, wire bars, and other forms of cupreous articles having an oxidic scale may be cleaned with advantage by the method of the invention.

In the treatment of copper rods, for example, removal of scale to the extent of between about 1.2% and 1.5% by weight of the rods yields clean rods which are substantially free of any oxide film and which are dustless and sliverless and therefore are well suited for drawing directly into high quality wire. In the treatment of copper wire bars and other cupreous articles of substantial mass, we have found that the complete removal of scale achieved in accordance with the invention shows up surface defects, such as shrinkage cracks and the like, which might otherwise remain undetected and thus lead unwittingly to imperfections in shapes produced therefrom.

The scale on a cupreous article treated in accordance with our invention appears on the article as loose flakes similar to loose bark on dead wood and may be substantially completely removed from the treated article by simple mechanical shock, by washing with a high pressure stream of water, by brushing or the like, or by a combination of two or more of these procedures. As a precaution to insure complete removal of the scale, it may be considered desirable to subject the scaled articles to a pickling operation in dilute sulphuric acid, to dipping in hot argol solution, or to other conventional treatment, although such treatment may in many cases be eliminated.

We claim:

1. The method of removing scale from cupreous articles which comprises exposing the article to the vapors of a volatilizable metal halide, treating the article under conditions causing chemical reaction to occur between the scale thereon and the metal halide, heating the article to a sufficiently high temperature to convert the scale to a form which separates readily from the article upon cooling thereof, and cooling the heated article, whereby the scale is caused to separate substantially completely from the article.

2. The method of removing scale from cupreous articles which comprises exposing the article to copper chloride vapors, treating the article under conditions causing chemical reaction to occur between the scale thereon and the copper chloride, heating the article to a dull red heat to convert the scale to a form which separates readily from the article upon cooling thereof, and cooling the heated article, whereby the scale is caused to separate substantially completely from the article.

3. The method of removing scale from cupreous articles which comprises heating a mixture of reactants capable at the temperature of such heating of liberating the vapors of a volotilizable metal halide, exposing the cupreous article to such vapors, treating the article under conditions causing chemical reaction to occur between the scale thereon and the metal halide, heating the article to a sufficiently high temperature to convert the scale to a form which separates readily from the article upon cooling thereof, and cooling the heated article, whereby the scale is caused to separate substantially completely from the article.

4. The method of removing scale from cupreous articles which comprises exposing the article to the vapors of a volatilizable metal halide, treating the article under conditions causing chemical reaction to occur between the scale and the metal halide, heating the article to a sufficiently high temperature to convert the scale to a form which separates readily from the article upon cooling thereof, and quenching the heated article in an aqeuous medium, whereby the scale is caused to separate substantially completely from the article.

5. The method of removing scale from cupreous articles which comprises exposing the article to the vapors of a volatilizable metal halide while the article is at a temperature below about 700° F., then heating the article to a dull red heat, and cooling the heated article, whereby the scale is caused to separate substantially completely from the article.

6. The method of removing scale from cupreous articles which comprises exposing the article to the vapors of a volatilizable metal chloride while the article is at a temperature below about 700° F., then heating the article to a dull red heat, and cooling the heated article, whereby the scale is caused to separate substantially completely from the article.

7. The method of removing scale from cupreous articles which comprises exposing the article to copper chloride vapors while the article is at a temperature below about 700° F., then heating the article to a dull red heat, and cooling the heated article, whereby the scale is caused to separate substantially completely from the article.

8. The method of removing scale from cupreous articles which comprises exposing the article to the vapors of a volatilizable metal halide while the article is at a temperature below about 700° F., then heating the article to a dull red heat, and quenching the heated article in an aqueous medium, whereby the scale is caused to separate substantially completely from the article.

9. The method of removing scale from cupreous articles which comprises exposing the article to the vapors of a volatilizable metal halide while the article is at a temperature below about 700° F., then heating the article to a dull red heat in the presence of said vapors, and cooling the heated article in such manner as to cause the scale to separate substantially completely therefrom.

10. The method of removing scale from cupreous articles which comprises exposing the article to the vapors of a volatilizable metal halide under conditions such as to effect condensation of a portion of said vapors on the surface of the article, then heating the article to a dull red heat, and cooling the heated article in such manner as to cause the scale to separate substantially completely therefrom.

11. The method of removing scale from cupreous articles which comprises exposing the article to copper chloride vapors under conditions such as to effect condensation of a portion of said copper chloride vapors on the surface of the article, then heating the article to a dull red heat, and quenching the heated article in an aqueous medium.

12. The method of removing scale from cupreous articles which comprises establishing in the atmosphere within a suitable furnace an appreciable concentration of the vapors of a volatilizable metal halide, introducing the cupreous article while relatively cold into the furnace atmosphere, heating the article in the furnace to a dull red heat, then withdrawing the article from the furnace, and cooling the withdrawn article, whereby the scale is caused to separate substantially completely from the article.

13. The method of removing scale from cupreous articles which comprises introducing a mixture of copper sulphate and sodium chloride into a receptacle within a furnace, heating said mixture sufficiently to liberate and establish in the furnace atmosphere an appreciable concentration of copper chloride vapors, introducing the cupreous article while relatively cold into the furnace atmosphere, heating the article in the furnace to a dull red heat, then withdrawing the article from the furnace, and cooling the withdrawn article, whereby the scale is caused to separate substantially completely from the article.

14. The method of removing scale from cupreous articles which comprises establishing in the atmosphere within a suitable furnace an appreciable concentration of the vapors of a volatilizable metal halide, introducing the cupreous article while relatively cold into the furnace atmosphere, slowly heating the article in the furnace to a dull red heat, then withdrawing the article from the furnace, and quenching the article in an aqueous medium, whereby the scale is caused to separate substantially completely from the article.

15. The method of removing scale from cupreous articles which comprises establishing in the atmosphere within a suitable furnace an appreciable concentration of the vapors of a volatilizable metal halide, introducing the cupreous article while relatively cold into the furnace atmosphere, gradually moving the article through the furnace while it becomes heated to a dull red heat, then withdrawing the article from the furnace, and cooling the withdrawn article, whereby the scale is caused to separate substantially completely therefrom.

16. In the treatment of cupreous articles for the removal of scale therefrom, the improvement which comprises exposing the article to the vapors of a volatilizable metal halide and treating the article under such conditions as to cause chemical reaction to occur between the scale and the halide, and subsequently removing scale from the article.

WILLIAM H. BASSETT, Jr.
CLERMONT J. SNYDER.
WILLIS G. MacLELLAND.